(12) United States Patent
Mithal et al.

(10) Patent No.: US 11,297,013 B2
(45) Date of Patent: Apr. 5, 2022

(54) SCALABLE AND SECURE ELECTRONIC COMMUNICATION MECHANISM

(71) Applicant: Microsoft Technology Licensing, LLC, Redmond, WA (US)

(72) Inventors: Vasudha Mithal, San Francisco, CA (US); Saurabh Kumar, Redmond, WA (US); Patrick Gannon, Santa Rosa, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 84 days.

(21) Appl. No.: 16/147,239

(22) Filed: Sep. 28, 2018

(65) Prior Publication Data

US 2020/0106721 A1    Apr. 2, 2020

(51) Int. Cl.
*G06F 15/16* (2006.01)
*H04L 51/02* (2022.01)
*H04W 4/14* (2009.01)
*H04L 51/10* (2022.01)
*H04L 51/04* (2022.01)

(52) U.S. Cl.
CPC .............. *H04L 51/02* (2013.01); *H04L 51/04* (2013.01); *H04L 51/10* (2013.01); *H04W 4/14* (2013.01)

(58) Field of Classification Search
CPC ......... H04L 51/02; H04L 51/04; H04L 51/10; H04W 4/14
USPC ........................................................ 709/206
See application file for complete search history.

(56) References Cited

U.S. PATENT DOCUMENTS

| | | | | |
|---|---|---|---|---|
| 9,996,956 | B1* | 6/2018 | Gracie | G06T 11/206 |
| 2007/0198629 | A1* | 8/2007 | Ganguly | H04L 12/66 |
| | | | | 709/203 |
| 2009/0228361 | A1* | 9/2009 | Wilson | G06Q 30/0256 |
| | | | | 705/14.42 |
| 2010/0094878 | A1* | 4/2010 | Soroca | G06Q 30/02 |
| | | | | 707/748 |
| 2014/0207793 | A1* | 7/2014 | Liu | G06Q 50/01 |
| | | | | 707/748 |
| 2017/0337584 | A1* | 11/2017 | Najdecki | G06Q 30/0257 |
| 2018/0359198 | A1* | 12/2018 | Eidem | H04L 51/02 |
| 2020/0045008 | A1* | 2/2020 | Banothu | G06Q 30/0239 |

* cited by examiner

*Primary Examiner* — Cheikh T Ndiaye
*Assistant Examiner* — Ayele F Woldemariam
(74) *Attorney, Agent, or Firm* — Nicholson De Vos Webster & Elliott LLP

(57) ABSTRACT

Techniques are provided for secure and scalable electronic messaging. In one technique, a decision tree data and targeting criteria for a content delivery campaign are received and stored. Multiple entities that satisfy the targeting criteria are identified. First content from the decision tree data is retrieved and sent to a messaging account of each of the entities. The first content is presented in a message interface of a first entity. In response to detecting that the first entity has provided particular input, second content from the decision tree data is identified based on the particular input. First data associated with the particular input and the second content are presented in the messaging interface along with the first content.

20 Claims, 13 Drawing Sheets

SCALABLE AND SECURE ELECTRONIC COMMUNICATION MECHANISM

TECHNICAL FIELD

The present disclosure relates to electronic communications and, more particularly to, scalable electronic communications over a computer network.

BACKGROUND

The Internet has enabled the delivery of electronic content to billions of people. Such delivery can be made through many different publisher systems, including online applications that provide space for online content provider systems to publish online content for end-users. For that reason, some entities maintain online content delivery exchange systems that allow different content provider systems to reach a wide online audience through different publishing platforms. If an end-user uses a computing device to interact with online content from a content provider system, then the computing device may be directed to the content provider system.

However, relatively few end-users actually interact with online content from different content provider systems. Furthermore, once end-users are directed to a content provider system, the digital environment thereof may be unfamiliar, causing end-users to cease interacting with the content provider system. The only way for the end-users to be reminded of their online visit to a content provider system is if they are presented again with online content through one or more third-party publishing systems, which is a low probability event. For these reasons, relying on end-users to click on online content is a relatively ineffective way to digitally reach out to end-users.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for implementing a scalable and secure electronic communication mechanism are provided. In one approach, a content provider creates a content delivery campaign that comprises targeting criteria and a decision tree of messages and guided replies. Each entity that is targeted by the campaign receives, in his/her respective messaging account, a first message from the decision tree. The message includes guided replies, or predefined options for a targeted entity to select. Depending on the option selected, a targeted entity receives a second message from the decision tree and, potentially, additional predefined, selectable options. The messages and the selected options may appear in a conversation history according to when the messages were posted, similar to an instant messaging interface. With the decision tree, no human user or chat bot is required to massively interact with thousands or potentially millions of users.

Embodiments described herein improve computer-related technology by offering a scalable solution for content providers to allow end users to automatically interact with their respective content in a secure way. For example, in an embodiment, the full context of a conversation with an end user is saved only in an inbox of the end user. As another example, communication is in real-time. As another example, embodiments help content providers manage end user responses in a very scalable way. A decision tree for the content provider is created once and responses are delivered without content provider intervention after the creation. Embodiments provide a unique way for content providers to run their respective content delivery campaigns in a messaging platform.

System Overview

Figure 1:
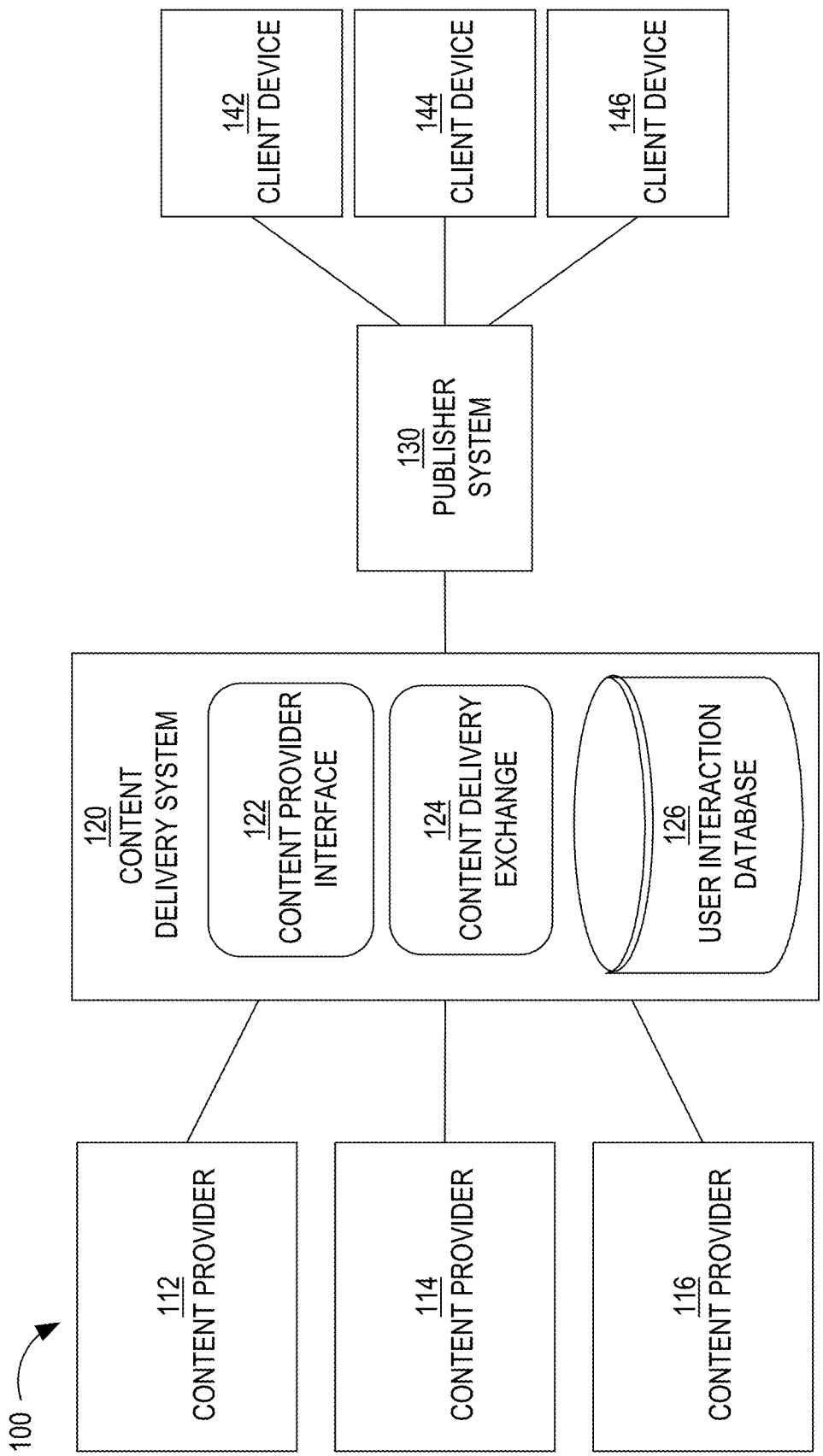
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery system 120, a publisher system 130, and client devices 142-146. Although three content providers are depicted, system 100 may include more or less content providers. Similarly, system 100 may include more than one publisher and more or less client devices.

Content providers 112-116 interact with content delivery system 120 (e.g., over a network, such as a LAN, WAN, or the Internet) to enable content items to be presented, through publisher system 130, to end-users operating client devices 142-146. Thus, content providers 112-116 provide content items to content delivery system 120, which in turn selects content items to provide to publisher system 130 for presentation to users of client devices 142-146. However, at the time that content provider 112 registers with content delivery system 120, neither party may know which end-users or client devices will receive content items from content provider 112.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery system 120.

Although depicted in a single element, content delivery system 120 may comprise multiple computing elements and devices, connected in a local network or distributed regionally or globally across many networks, such as the Internet. Thus, content delivery system 120 may comprise multiple computing elements, including file servers and database systems. For example, content delivery system 120 includes (1) a content provider interface 122 that allows content providers 112-116 to create and manage their respective content delivery campaigns and (2) a content delivery exchange 124 that conducts content item selection events in response to content requests from a third-party content delivery exchange and/or from publisher systems, such as publisher system 130.

Publisher system 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher system 130 (and/or its affiliates). A content request may be a request that is immediately preceded by user input (e.g., selecting a hyperlink on web page) or may be initiated as part of a subscription, such as through a Rich Site Summary (RSS) feed. In response to a request for content from a client device, publisher system 130 provides the requested content (e.g., a web page) to the client device.

Simultaneously or immediately before or after the requested content is sent to a client device, a content request is sent to content delivery system 120 (or, more specifically, to content delivery exchange 124). That request is sent (over a network, such as a LAN, WAN, or the Internet) by publisher system 130 or by the client device that requested the original content from publisher system 130. For example, a web page that the client device renders includes one or more calls (or HTTP requests) to content delivery exchange 124 for one or more content items. In response, content delivery exchange 124 provides (over a network, such as a LAN, WAN, or the Internet) one or more particular content items to the client device directly or through publisher system 130. In this way, the one or more particular content items may be presented (e.g., displayed) concurrently with the content requested by the client device from publisher system 130.

In response to receiving a content request, content delivery exchange 124 initiates a content item selection event that involves selecting one or more content items (from among multiple content items) to present to the client device that initiated the content request. An example of a content item selection event is an auction.

Content delivery system 120 and publisher system 130 may be owned and operated by the same entity or party. Alternatively, content delivery system 120 and publisher system 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 124, and that bids for space (on one or more publisher systems, such as publisher system 130) to present content items on behalf of multiple content providers. Thus, a bidder is another source of content items that content delivery exchange 124 may select for presentation through publisher system 130. Thus, a bidder acts as a content provider to content delivery exchange 124 or publisher system 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery system 120 through, for example, content provider interface 122. An example of content provider interface 122 is Campaign Manager™ provided by LinkedIn. Content provider interface 122 comprises a set of user interfaces that allow a representative of a content provider to create an account for the content provider, create one or more content delivery campaigns within the account, and establish one or more attributes of each content delivery campaign. Examples of campaign attributes are described in detail below.

A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign is an organized way to present information to users that qualify for the campaign. Different content providers have different purposes in establishing a content delivery campaign. Example purposes include having users view a particular video or web page, fill out a form with personal information, purchase a product or service, make a donation to a charitable organization, volunteer time at an organization, or become aware of an enterprise or initiative, whether commercial, charitable, or political.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view, select, or click on the set of content items, when a certain number of users purchase a product/service associated with the content delivery campaign or fill out a particular form on a website, or when a budget of the content delivery campaign has been exhausted.

A content delivery campaign may specify one or more targeting criteria that are used to determine whether to present a content item of the content delivery campaign to one or more users. (In most content delivery systems, targeting criteria cannot be so granular as to target individual members.) Example factors include date of presentation, time of day of presentation, characteristics of a user to which the content item will be presented, attributes of a computing device that will present the content item, identity of the publisher, etc. Examples of characteristics of a user include demographic information, geographic information (e.g., of an employer), job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 124 receives, from a computing device, a request that does not satisfy the targeting criteria, then content delivery exchange 124 ensures that any content items associated with the particular content delivery campaign are not sent to the computing device.

Thus, content delivery exchange 124 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery exchange 124 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher system 130 may not satisfy targeting criteria of one content item of a campaign, the same content request may satisfy targeting criteria of another content item of the campaign.

Different content delivery campaigns that content delivery system 120 manages may have different charge models. For example, content delivery system 120 (or, rather, the entity that operates content delivery system 120) may charge a content provider of one content delivery campaign for each presentation of a content item from the content delivery campaign (referred to herein as cost per impression or CPM). Content delivery system 120 may charge a content provider of another content delivery campaign for each time a user interacts with a content item from the content delivery campaign, such as selecting or clicking on the content item (referred to herein as cost per click or CPC). Content delivery system 120 may charge a content provider of another content delivery campaign for each time a user performs a particular action, such as purchasing a product or service, downloading a software application, or filling out a form (referred to herein as cost per action or CPA). Content delivery system 120 may manage only campaigns that are of the same type of charging model or may manage campaigns that are of any combination of the three types of charging models.

A content delivery campaign may be associated with a resource budget that indicates how much the corresponding content provider is willing to be charged by content delivery system 120, such as $100 or $5,200. A content delivery campaign may also be associated with a bid amount that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items (e.g., from different content delivery campaigns) are considered and a subset selected for presentation on a computing device in response to a request. Thus, each content request that content delivery exchange 124 receives triggers a content item selection event.

For example, in response to receiving a content request, content delivery exchange 124 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

As another example, users are assigned to content delivery campaigns (or specific content items within campaigns) "off-line"; that is, before content delivery exchange 124 receives a content request that is initiated by the user. For example, when a content delivery campaign is created based on input from a content provider, one or more computing components may compare the targeting criteria of the content delivery campaign with attributes of many users to determine which users are to be targeted by the content delivery campaign. If a user's attributes satisfy the targeting criteria of the content delivery campaign, then the user is assigned to a target audience of the content delivery campaign. Thus, an association between the user and the content delivery campaign is made. Later, when a content request that is initiated by the user is received, all the content delivery campaigns that are associated with the user may be quickly identified, in order to avoid real-time (or on-the-fly) processing of the targeting criteria. Some of the identified campaigns may be further filtered based on, for example, the campaign being deactivated or terminated, the device that the user is operating being of a different type (e.g., desktop) than the type of device targeted by the campaign (e.g., mobile device).

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price that represents how much the corresponding content provider is willing to pay (e.g., content delivery system 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), members having opted out of content from a particular content provider, and a domain of a URL that a content item might include.

An example of a content item selection event is an advertisement auction, or simply an "ad auction."

In one embodiment, content delivery exchange 124 conducts one or more content item selection events. Thus, content delivery exchange 124 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a CPC or CPM of each campaign.

In another embodiment, an exchange that is owned and operated by an entity that is different than the entity that operates content delivery system 120 conducts one or more content item selection events. In this latter embodiment, content delivery system 120 sends one or more content items to the other exchange, which selects one or more content items from among multiple content items that the other exchange receives from multiple sources. In this embodiment, content delivery exchange 124 does not necessarily know (a) which content item was selected if the selected content item was from a different source than content delivery system 120 or (b) the bid prices of each content item that was part of the content item selection event. Thus, the other exchange may provide, to content delivery system 120, information regarding one or more bid prices and, optionally, other information associated with the content item(s) that was/were selected during a content item selection event, information such as the minimum winning bid or the highest bid of the content item that was not selected during the content item selection event.

Event Logging

Content delivery system 120 may log one or more types of events, with respect to content item summaries, across client devices 152-156 (and other client devices not depicted). For example, content delivery system 120 determines whether a content item summary that content delivery exchange 124 delivers is presented at (e.g., displayed by or played back at) a client device. Such an "event" is referred to as an "impression." As another example, content delivery system 120 determines whether a content item summary that exchange 124 delivers is selected by a user of a client device. Such a "user interaction" is referred to as a "click." Content delivery system 120 stores such data as user interaction data, such as an impression data set and/or a click data set. Thus, content delivery system 120 may include a user interaction database 128. Logging such events allows content delivery system 120 to track how well different content items and/or campaigns perform.

For example, content delivery system 120 receives impression data items, each of which is associated with a different instance of an impression and a particular content item summary. An impression data item may indicate a particular content item, a date of the impression, a time of the impression, a particular publisher or source (e.g., onsite v. offsite), a particular client device that displayed the specific content item (e.g., through a client device identifier), and/or a user identifier of a user that operates the particular client device. Thus, if content delivery system 120 manages delivery of multiple content items, then different impression data items may be associated with different content items. One or more of these individual data items may be encrypted to protect privacy of the end-user.

Similarly, a click data item may indicate a particular content item summary, a date of the user selection, a time of the user selection, a particular publisher or source (e.g., onsite v. offsite), a particular client device that displayed the specific content item, and/or a user identifier of a user that operates the particular client device. If impression data items are generated and processed properly, a click data item should be associated with an impression data item that corresponds to the click data item. From click data items and impression data items associated with a content item summary, content delivery system 120 may calculate a CTR for the content item summary.

Initiating a Conversation

A conversation with a targeted user may begin in one or more ways. For example, content delivery exchange 124 causes a content item from a content delivery campaign to be displayed on a client device (of a targeted user) that requests content from publisher system 130. The content item (e.g., sponsored content) is displayed on a web page with the requested content. The content item may include a graphical element (e.g., a button) that invites the targeted user to "Learn More." In response to selecting the graphical element, a message from a decision tree (described in more detail herein) associated with the content delivery campaign is stored in a messaging account associated with the targeted user.

As a similar example, an organization page (where a particular organization that "owns" the page determines at least a portion of the content on the page) or a product review page includes a graphical element that invites a viewing user (i.e., "viewer") of the page to "Learn More" or "Contact Us." The product review page is associated with a particular organization or company. Selection of the graphical element causes a message from a decision tree to be stored in a messaging account of the viewer.

As another example, instead of requiring a viewer to perform an action, content delivery system 120 identifies a user as a targeted user (e.g., based on the user's profile data satisfying the targeting criteria of the content delivery campaign) and causes a message from the decision tree of the corresponding content delivery campaign to be stored in the messaging account of the targeted user.

In none of these examples is an external content delivery exchange involved. Further, a targeted message initiated based on user input or based on targeting criteria might not involve a content item selection event, bids, or ranking of multiple content delivery campaigns, as is the case in a traditional ad exchange. Alternatively, a targeted message that precedes a conversation may be initiated by a content item selection event that involves bids.

The messaging account is part of a messaging system provided by an entity, such as publisher system 130. Thus, the entity may host or maintain many messaging accounts, one for each registered user of the entity.

Example Messaging System

Figure 2:
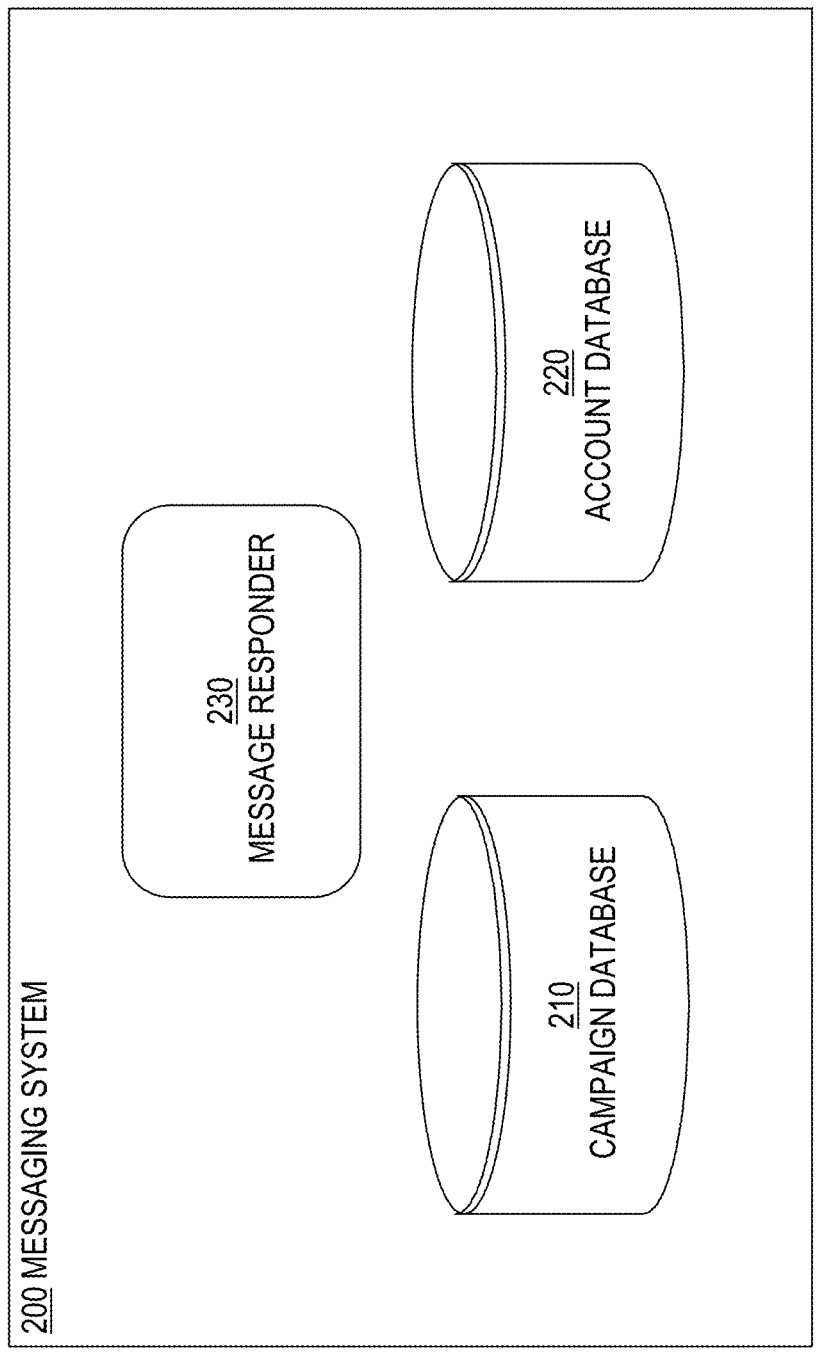
FIG. 2 is a block diagram that depicts an example messaging system for providing continued relevant content in an instant messaging format, in an embodiment.

FIG. 2 is a block diagram that depicts an example messaging system 200 for providing continued relevant content in an instant messaging format, in an embodiment. Messaging system 200 may be part of content delivery system 120, publisher system 130, or communicatively coupled to one or both of content delivery system 120 or publisher system 130. In another embodiment, messaging system 200 is completely separate from systems 120 and 130.

Messaging system 200 includes campaign database 210, account database 220, and message responder 230. Campaign database 210 comprises information about multiple content delivery campaigns, at least some of which information includes decision tree data. Campaign database 210 may be stored on one or more storage devices (persistent and/or volatile) that may reside within the same local network as content delivery system 120 and/or in a network that is remote relative to content delivery system 120.

Account database 220 comprises information about multiples accounts. Like campaign database 210, account database 220 may be stored on one or more storage devices (persistent and/or volatile) that may reside within the same local network as messaging system 200 and/or in a network that is remote relative to messaging system 200. Thus, each storage device may be either (a) part of messaging system 200 or (b) accessed by messaging system 200 over a local network, a wide area network, or the Internet.

In a social networking context, messaging system 200 is provided by a social network provider, such as LinkedIn. In this context, each account (of at least some accounts) in account database 220 includes a user profile, each provided by a different user. A user's profile may include a first name, last name, an email address, residence information, a mailing address, a phone number, one or more educational institutions attended, one or more current and/or previous employers, one or more current and/or previous job titles, a list of skills, a list of endorsements, and/or names or identities of friends, contacts, connections of the user, and derived data that is based on actions that the candidate has taken. Examples of such actions include jobs to which the user has applied, views of job postings, views of company pages, views of learning content, number of online (e.g., video) courses completed, messages sent between the user and other users in the user's social network, and public messages that the user posted and that are visible to users outside of the user's social network (but that are registered users/members of the social network provider).

Some data within a user's profile (e.g., work history, skills) may be provided by the user while other data within the user's profile (e.g., skills and endorsement) may be provided by a third party, such as a "friend," connection, colleague of the user.

An account manager (not depicted) may prompt users to provide profile information in one of a number of ways. For example, the account manager may have provided a web page with a text field for one or more of the above-referenced types of information. In response to receiving profile information from a user's device, the account manager stores the information in an account that is associated with the user and that is associated with credential data that is used to authenticate the user when the user attempts to log into messaging system 200 (or a related system, such as publisher system 130) at a later time. Each text string provided by a user may be stored in association with the field into which the text string was entered. For example, if a user enters "Sales Manager" in a job title field, then "Sales Manager" is stored in association with type data that indicates that "Sales Manager" is a job title. As another example, if a user enters "Java programming" in a skills field, then "Java programming" is stored in association with type data that indicates that "Java programming" is a skill.

In an embodiment, messaging system 200 stores access data in association with a user's account. Access data indicates which users, groups, or devices can access or view the user's profile or portions thereof. For example, first access data for a user's profile indicates that only the user's connections can view the user's personal interests, second access data indicates that confirmed recruiters can view the user's work history, and third access data indicates that anyone can view the user's endorsements and skills.

In an embodiment, some information in a user profile is determined automatically. For example, a user specifies, in his/her profile, a name of the user's employer. A system component determines, based on the name, where the employer and/or user is located. If the employer has multiple offices, then a location of the user may be inferred based on an IP address associated with the user when the user registered with a social network service (e.g., provided by publisher system 130) and/or when the user last logged onto the social network service.

Other types of accounts in account database 220 may be for organizations, such as companies, charitable organizations, academic institutions, government agencies, etc. Example attributes of such organizations may include, if applicable, a geographic location for their headquarters, contact information, size of organization, number of clients/customers served, revenue totals, profits, etc.

While many examples herein are in the context of social networking, embodiments are not so limited.

Messaging system 200 provides a user interface that allows a user of an account to perform one or more of the following actions: create and send messages to one or more intended recipients, include attachments to undelivered messages, view received messages, view previously sent messages, delete messages, view possible contacts, categorize messages into one or more pre-defined or user-defined categorizes, and search and/or group/sort messages based on sender, subject, time (e.g., of receipt or sending), body text, size, category, and attachments.

In a related embodiment, account database 220 is separate from messaging system 200 and is part of publisher system 130.

Account Messages

In an embodiment, an account includes messages that a user has sent and/or received to/from other users or entities (e.g., users or organizations, such as companies, schools, and marketers). A message may be between the user and one other entity, in which case only the user and the other entity are able to view the message (or have access rights to view the message). A message may be between the user and multiple other entities, in which the user and the multiple entities are able to view the message. Thus, the message is private with respect to the user and the multiple entities.

A message may be one of multiple messages in a conversation between a user and one or more other entities. If the user selects a conversation (e.g., by selecting an icon representing a conversation), then messaging system 200 presents any messages in the conversation in a user interface presented on a client device of the user. If there are multiple messages in a conversation, then the messages may be ordered based on time of receipt or sending of the message. If all messages in the conversation cannot be displayed concurrently on the screen of the client device, then the user interface includes controls (e.g., a scroll bar) that allows the user to scroll through the conversation to view previous messages in the conversation.

Decision Tree

In an embodiment, message responder 230 uses decision tree data of a content delivery campaign to determine a pre-defined message to store in an account of a user. A decision tree comprises multiple ordered content items and decision points. A decision point is associated with one of the content items and comprises two or more options. For example, a decision point may involve a yes/no question, two or more topics of interest, and two or more ratings of an experience.

A decision tree may be viewed as a directed graph with a single root node. Each node represents a message and each edge represents a decision point (if multiple edges emanate from the parent node) or an ordering of messages (if only a single edge emanates from the parent node). If a decision point is represented as an edge, then each edge includes content (e.g., text) that corresponds to an option in the decision point.

In a related embodiment, a decision tree has multiple root nodes where each root node corresponds to different criteria, such as contextual attributes (e.g., time, type of user device) and entity attributes (e.g., from a user's profile or derived based on online activities of the user). However, paths from different root nodes down the decision tree intersect, such that the same intermediate node(s) and/or edges in the decision tree may be arrived at from different root nodes.

In an embodiment, an option results in one of three actions: showing a subsequent message from the decision tree, opening a landing page of a third party (such as a page hosted by the content provider that initiated the content delivery campaign), opening a lead generation form (as described in more detail herein).

In an embodiment, content provider interface 122 includes one or more user interface elements to receive decision tree data from a content provider (e.g., via a file upload) or create a decision tree step by step. If the former, then content delivery system 120 may include a component that verifies that the uploaded decision tree data conforms to a particular format. If not, then content delivery system 120 notifies the content provider (or a representative thereof) through one or more means, such as a notification through content provider interface 122 or an email message sent to an email account of the representative.

Because the decision tree data and user responses are stored in association with content delivery system 120 and/or publisher system 130, embodiments do not require setting up message accounts or inboxes for content providers that provide the decision tree data.

Also, with the aid of a decision tree, content providers are not required to have people responding to user responses. Instead, targeted users receive reply messages based on pre-defined options. In an embodiment, a pre-defined reply message includes a link to open up a web chat between the viewer of the message and a person (or a bot) representing the corresponding content provider. Success of natural language processing (NLP)/AI chat bots that process raw textual input has been limited.

Figure 3A:
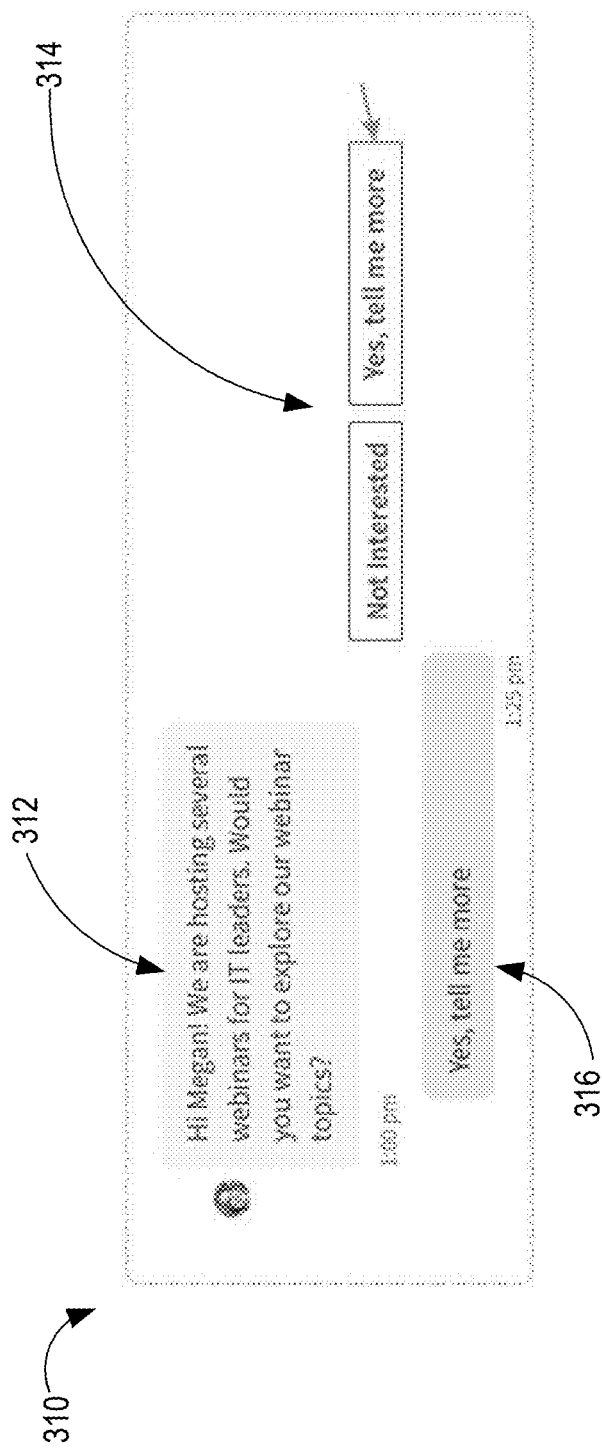
FIGS. 3A-3C are screenshots of example content items and decision points in a decision tree that a message responder uses to send messages to a message account of a user, in an embodiment.
Figure 3B:
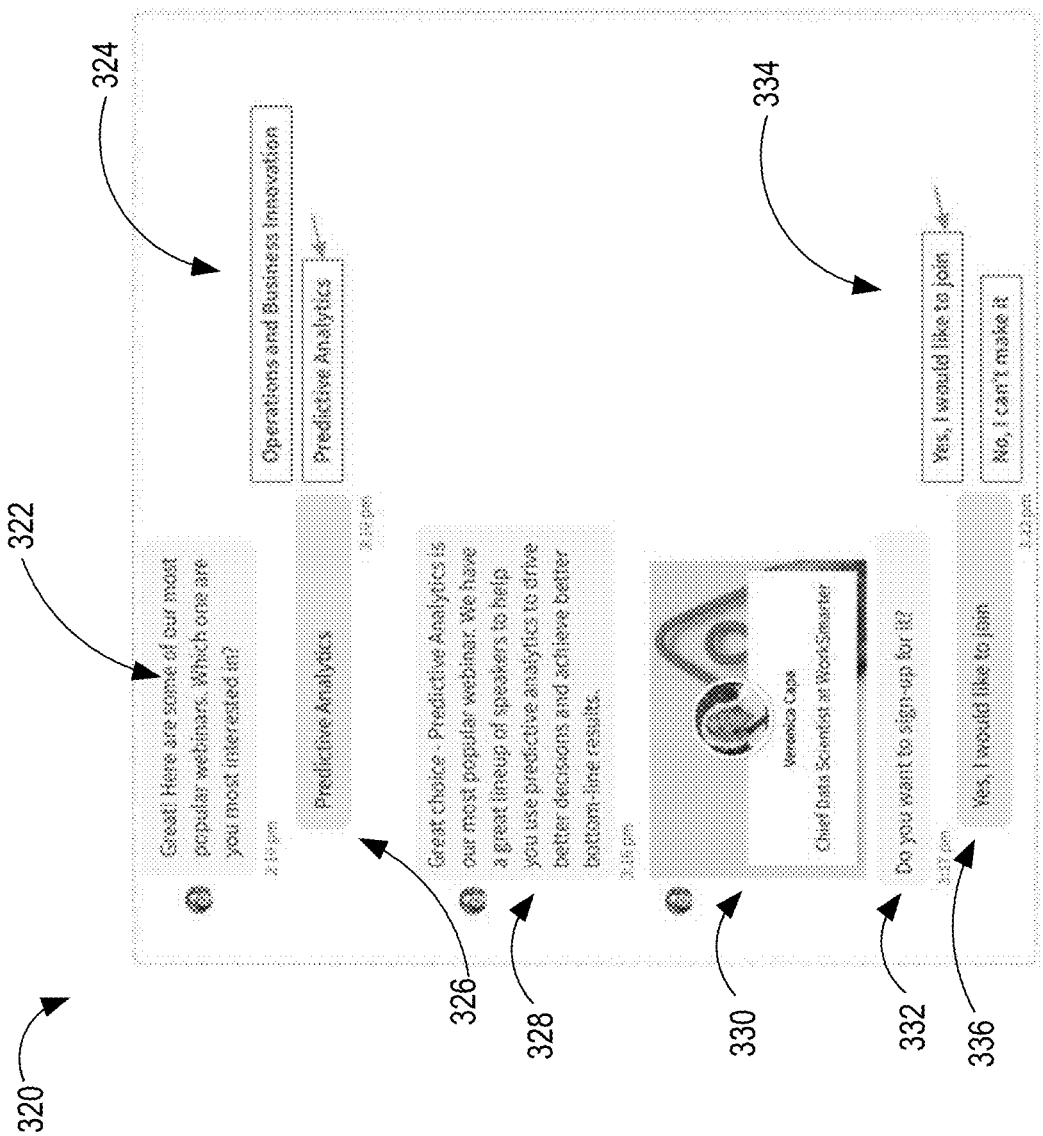
Figure 3C:
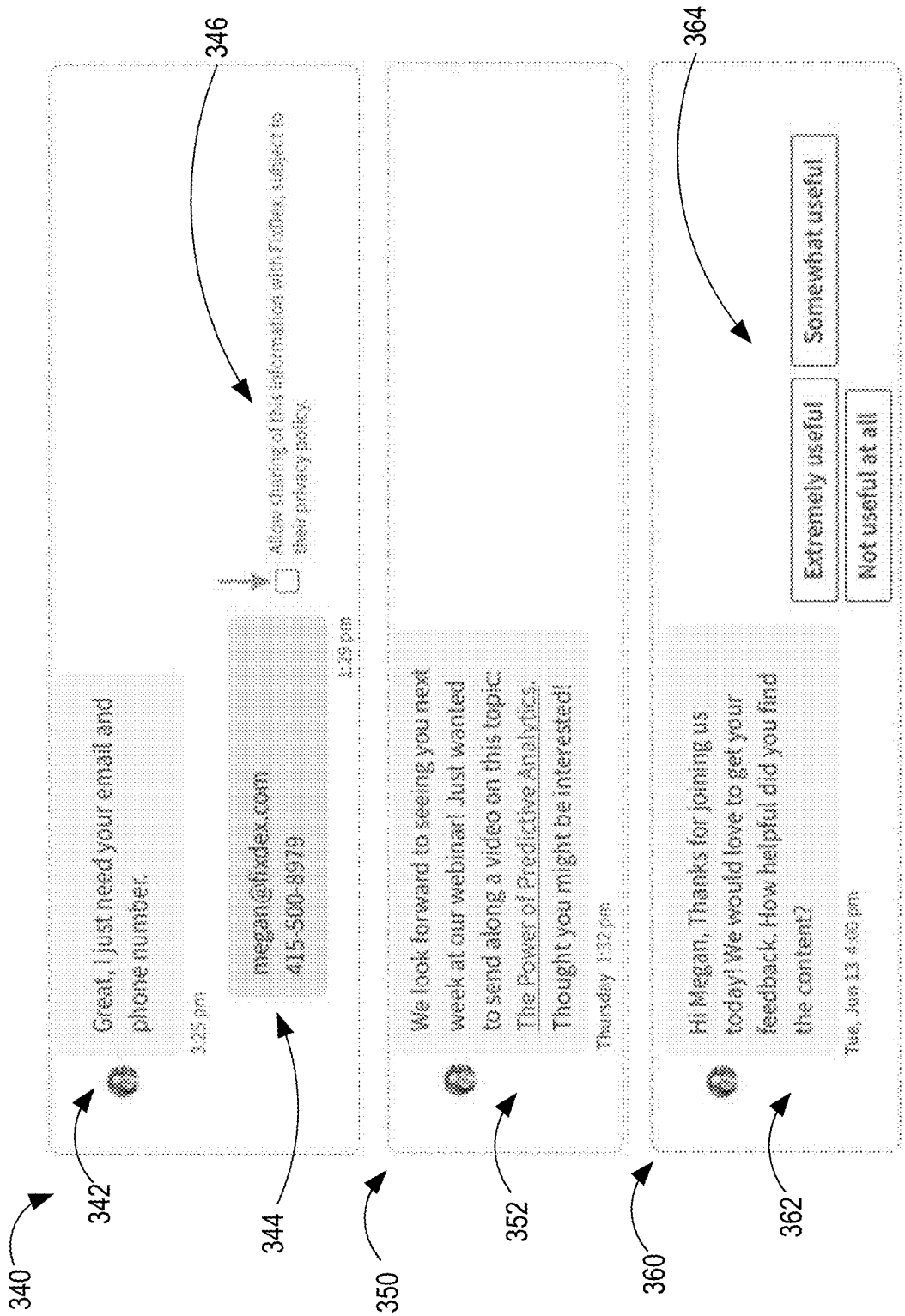

FIGS. 3A-3C include screenshots of example content items and decision points in a decision tree that message responder 230 uses to send messages to a message account of a user. Each content item and decision point corresponds to a particular stage in a marketing funnel. Example stages include prospects, awareness, consideration, conversion, nurture, and follow up.

FIG. 3A includes a screenshot 310 of a decision tree message 312, a decision point 314, and a user's response 316. Screenshot 310 corresponds to the awareness stage. Decision point 314 includes two selectable options: "Not interested" and "Yes, tell me more." In this example, the user selects the second option, which becomes the substance of response 316. Also, in this screenshot and the remaining screenshots, a timestamp is stored and displayed with each message.

FIG. 3B includes a screenshot 320 of a decision tree message 322, a decision point 324, and a response 326. Screenshot 320 corresponds to the consideration stage. Decision point 324 includes two selectable options: "Operations and Business Innovation" and "Predictive Analytics." In this example, the user selects the second option, which becomes the substance of response 326.

In response to selection of the second option (corresponding to "Predictive Analytics"), message responder 230 retrieves decision tree messages 328-332 and causes messages 328-332 to be stored in the message account of the user. If contents of the message account, and in particular, the conversation history are currently displayed to the user, then messages 328-332 may appear automatically and simultaneously or in quick succession, or may appear at different times, such as a few seconds or minutes apart. If there is a delay in the presentation of the messages, such a delay may be enforced or dictated by the decision tree, which may have been established by the corresponding content provider or by settings established by an administrator of content delivery system 120.

Decision point 334 is also presented after decision tree message 332 and includes two selectable options: "Yes, I would like to join" and "No, I can't make it." In this example, the user selects the second option, which becomes the substance of response 336.

FIG. 3C includes a screenshot 340 of a decision tree message 342, a user's response 344, and a decision point 346. Screenshot 340 corresponds to the conversion stage. Decision tree message 342 invites the user to enter, as a response to message 342, his/her email address and phone number. After entering an email address and phone number, decision point 346 is presented and includes one selectable option that, when selected, indicates that the user gives authorization to share the entered contact information with a particular organization, subject to a privacy policy. If the option is not selected, then the contact information is not shared.

FIG. 3C also includes a screenshot 350 of a decision tree message 352. Screenshot 350 corresponds to the nurture stage. In this example, there are no decision points. Instead, decision tree message 352 reminds the user about a webinar for which the user signed up and includes a link to a video that pertains to the topic of the webinar. If the user selects the link, then the corresponding content provider may be notified that the user selected the link and potentially viewed the video. Although not depicted, the decision tree may include a message that is presented in response to the user selecting the link and/or watching the video. The message may request the user to rate the video and/or invite the user to recommend the video to a friend or connection in a social network.

FIG. 3C also includes a screenshot 360 of a decision tree message 362 and a decision point 364. Screenshot 360 corresponds to the follow up stage. Decision tree message 362 thanks the user for attending a webinar and invites the user to provide feedback regarding the webinar. Decision point 364 includes three selectable options: "Extremely useful," "Somewhat useful," and "Not useful at all." Alternatively, decision point 364 may comprise five stars and by selecting, for example, the fourth star, the user is essentially rating the webinar with a 4 out of 5-star rating.

In an embodiment, decision tree messages 312, 322, 332, 338-342, 352, and 362 may be viewed in a single conversation history interface. If all such messages (and responses) cannot be displayed simultaneously (e.g., due to the screen size constraints of the client device), then a scrollable interface element may be presented to allow the user to scroll through those messages/responses.

Example Process

Figure 4:
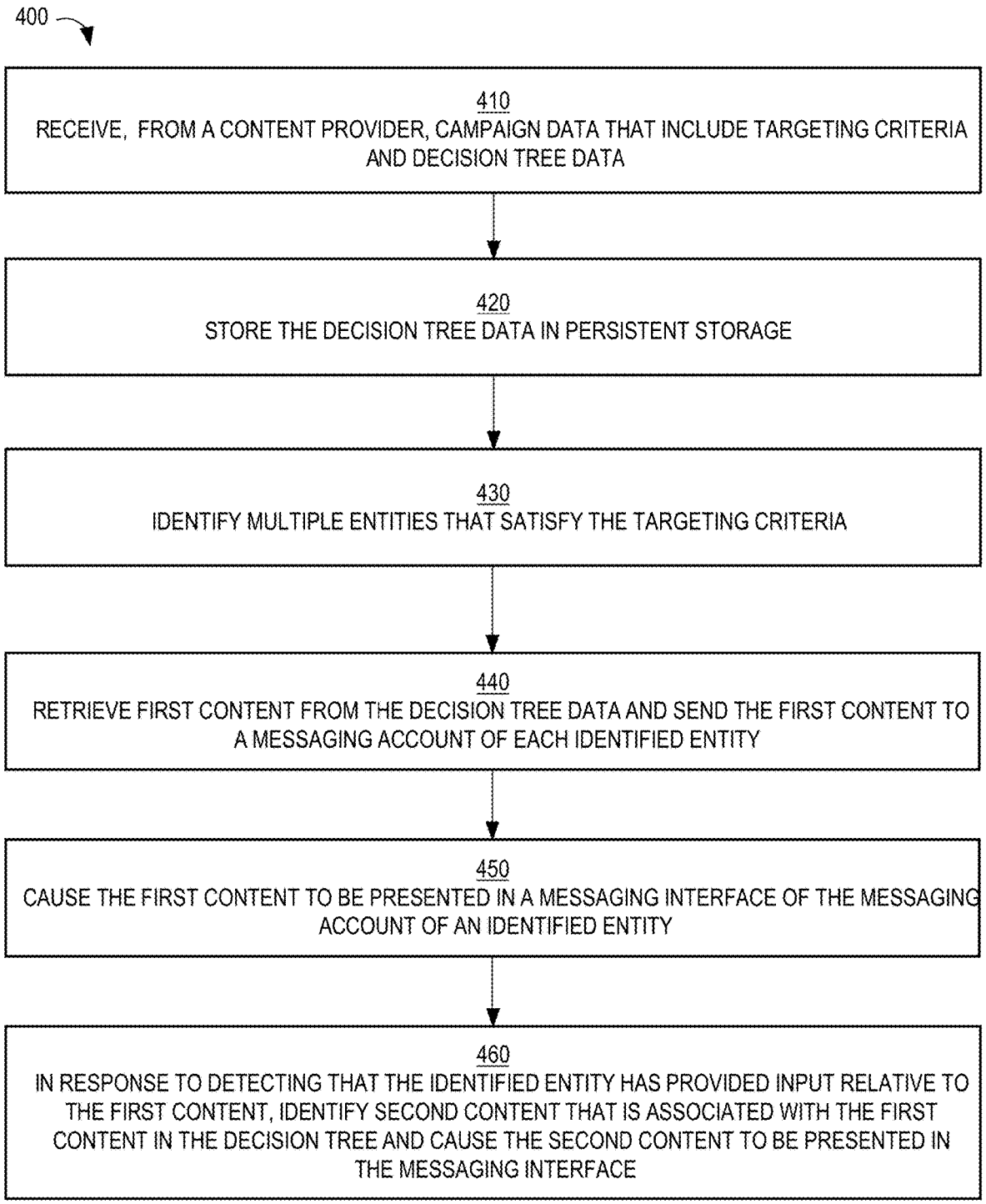
FIG. 4 is a flow diagram that depicts a process 400 providing continued relevant content in an instant messaging format, in an embodiment.

FIG. 4 is a flow diagram that depicts a process 400 for providing continued relevant content in a messaging format, in an embodiment. Process 400 may be implemented, at least in part, by content delivery system 120. Process 400 is described in reference to FIGS. 5A-5B, which includes screenshots 510-540 of an example messaging interface, in an embodiment.

At block 410, campaign data is received from a content provider. The campaign data includes a decision tree data and targeting criteria. Block 410 may involve receiving user input through a user interface provided by content provider interface 122 or may involve receiving a file in a certain format that content delivery system 120 analyzes to create a decision tree.

At block 420, the campaign data is stored in persistent storage.

At block 430, multiple entities that satisfy the targeting criteria are identified. For example, that targeting criteria is compared to profile data associated with each entity of potentially many entities. If there is a match, then the corresponding entity is identified.

At block 440, first content from the decision tree data is retrieved and sent to a messaging account of each identified entity. Block 440 may be performed by identifying the first node in the decision tree; for example, a node that has no parent node. Once the node is identified, content of the node is packaged in a message that is stored in a messaging account of each identified entity. The message does not have to be transferred over the Internet or other wide area network.

At block 450, the first content is displayed on a computing device of an identified entity. Block 450 may be performed in response to the identified entity logging into his/her online account and selecting a messaging interface icon associated with the messaging account. In response to a request from the computing device, publisher system 130 (or messaging system 200) transmits the first content over a computer network (e.g., the Internet) to the computing device.

Figure 5A:
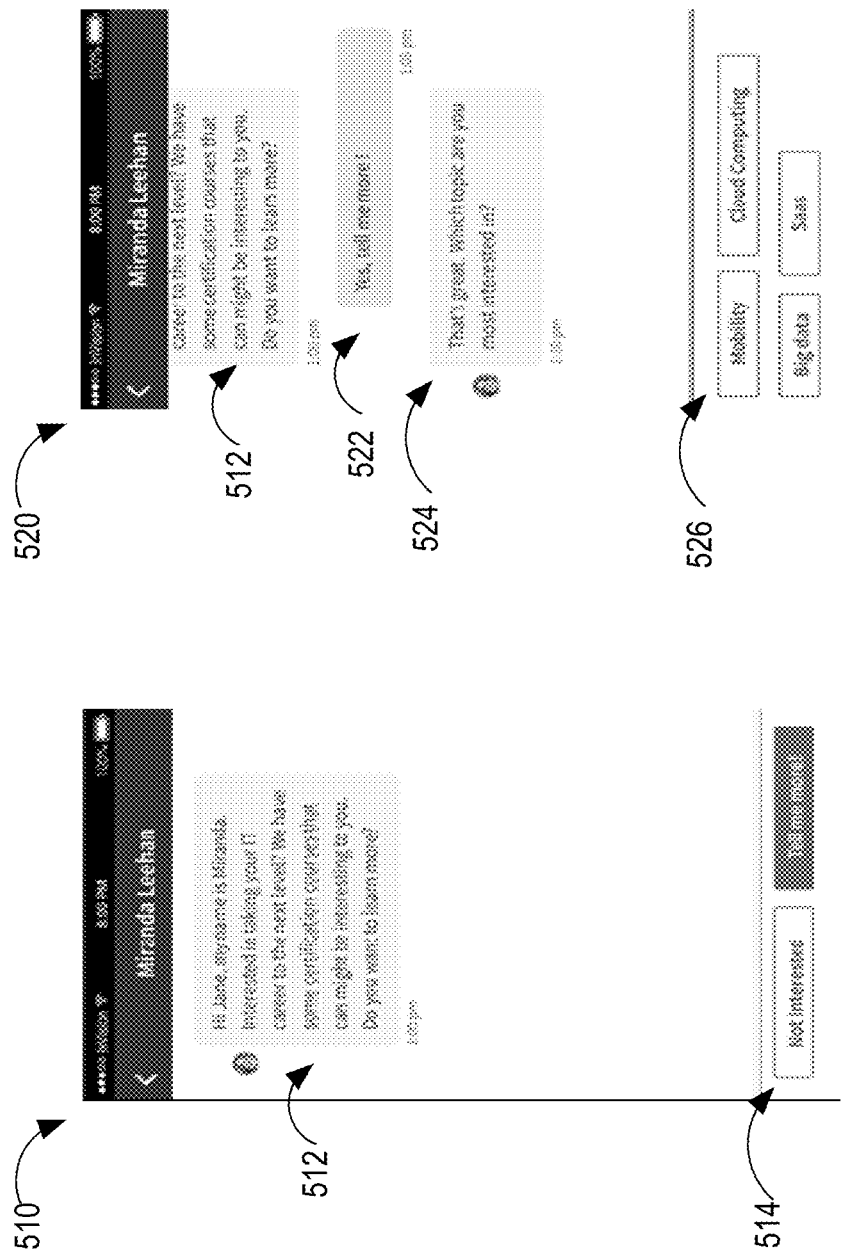
FIGS. 5A-5B are screenshots of an example messaging interface, in an embodiment.

FIG. 5A includes a screenshot 510 of example first content from decision tree data associated with the campaign. The first content includes a message 512 and a decision point 514 that comprises two options: a "Not Interested" option and a "Tell me more!" option.

At block 460, in response to detecting that the identified entity has provided input relative to the first content in a first messaging interface associated with the identified entity, second content from the decision tree is identified and caused to be displayed on the computing device. Block 460 also comprises including data associated with the input in the first messaging interface.

FIG. 5A also includes a screenshot 520 of example second content from the decision tree data associated with the campaign. In this example, the identified entity selected the "Tell me more!" option, which selection indicates a positive response to the question reflected in message 512. As a result of the selection, the text of the selected option is included as a message 522 in the conversation history along with message 512. Also, the example second content is included in a message 524, which is associated with decision point 526 that comprises four options: a "Mobility" option, a "Cloud Computing" option, a "Big data" option, and a "Saas" option, each option correspond to a different topic. Thus, when message 524 is displayed, the options of decision point 526 are also displayed.

In this example, message 524 comprising the second content and message 512 comprises the first content is included in the same messaging interface. In this way, the identified entity is able to view both the first content and the second content, either concurrently or within a few seconds of each via scrolling input.

Figure 5B:
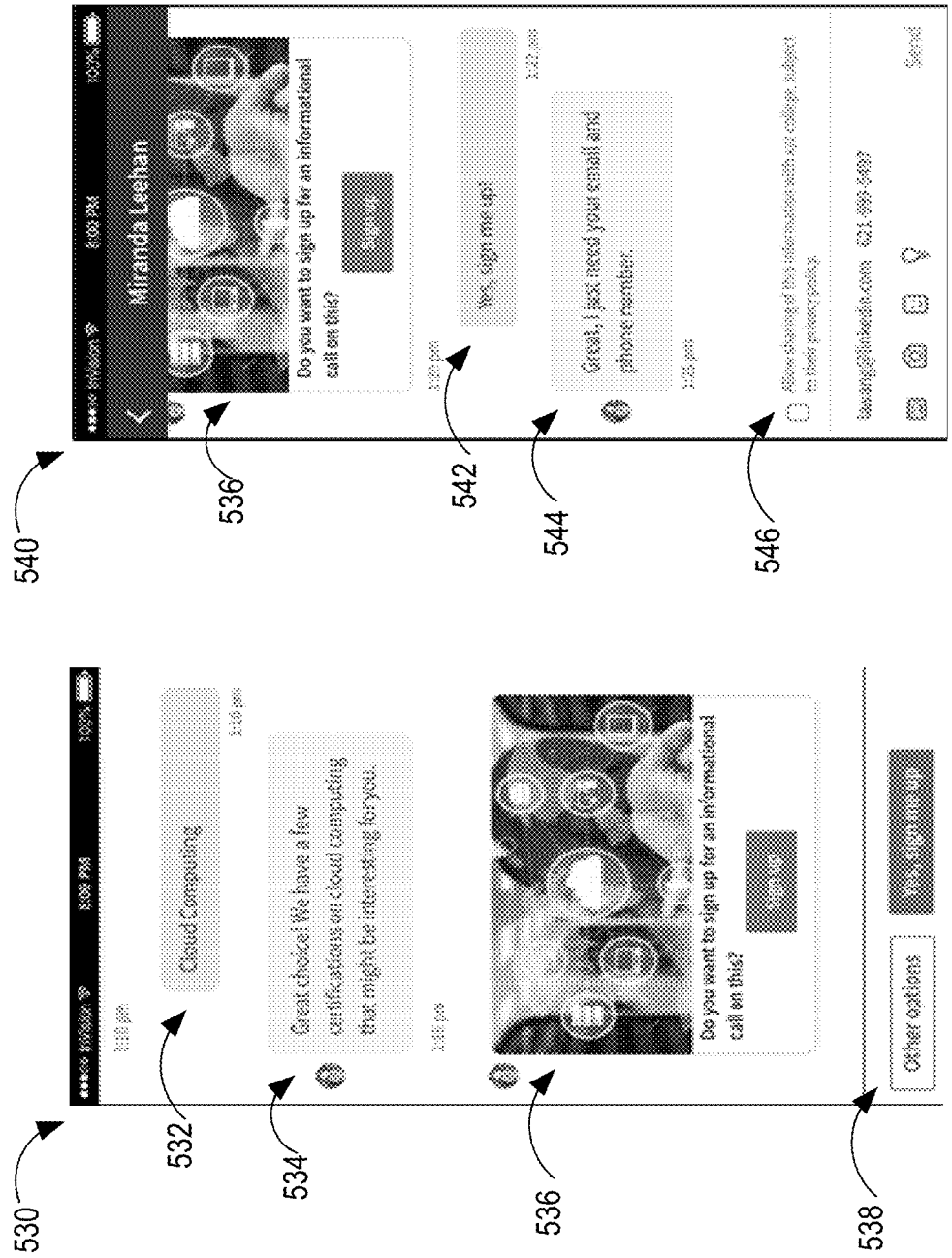

Continuing with the depicted example, the identified entity selects the "Cloud Computing" option from decision point 526. As a result, third content is displayed. FIG. 5B includes a screenshot 530 of example third content from the decision tree data associated with the campaign. As a result of the selection, the text of the selected option is included as a message 532 in the conversation history. Also, the example third content is included in messages 534 and 536. Thus, the third content is associate with multiple messages. Message 536 includes an image, text, and a (e.g., selectable) button labeled "Sign up." Also, the third content is associated with decision point 538 that comprises two options: a "Other options" option and a "Yes, sign me up" option. Thus, when message 536 is displayed, the options of decision point 538 are also displayed.

Continuing with the depicted example, the identified entity selects the "Yes, sign me up" option from decision point 538. As a result, fourth content is displayed. FIG. 5B also includes a screenshot 540 of example fourth content from the decision tree data associated with the campaign. As a result of the selection, the text of the selected option is included as a message 542 in the conversation history. Also, the example fourth content is included in message 544. In this example, instead of prompting the identified entity to select a pre-defined option, message 544 prompts the identified entity to manually specify an email address and a phone number. The conversation history also includes a selectable sharing option 546 that gives permission to messaging system 200 to share the contact information with a particular college, subject to their privacy policy. Thus, a purpose of the decision tree data is "lead generation" or identifying potential leads or customers of a product or service.

In this example, no decision point is associated with the example fourth content. Instead, upon entering and submitting the email address and phone number through the messaging interface, the contact information is effectively shared with the content provider that initiated the content delivery campaign. Content delivery system 120, publisher system 130, or messaging system 200 may automatically notify the content provider regarding the received contact information, in which case a representative of the content provider may operate a device to request the contact information from one of systems 120, 130, or 200. Alternatively, the contact information is automatically transmitted to the content provider without requiring the content provider to request the contact information after the contact information is obtained from the identified entity.

Lead Generation

Figure 6:
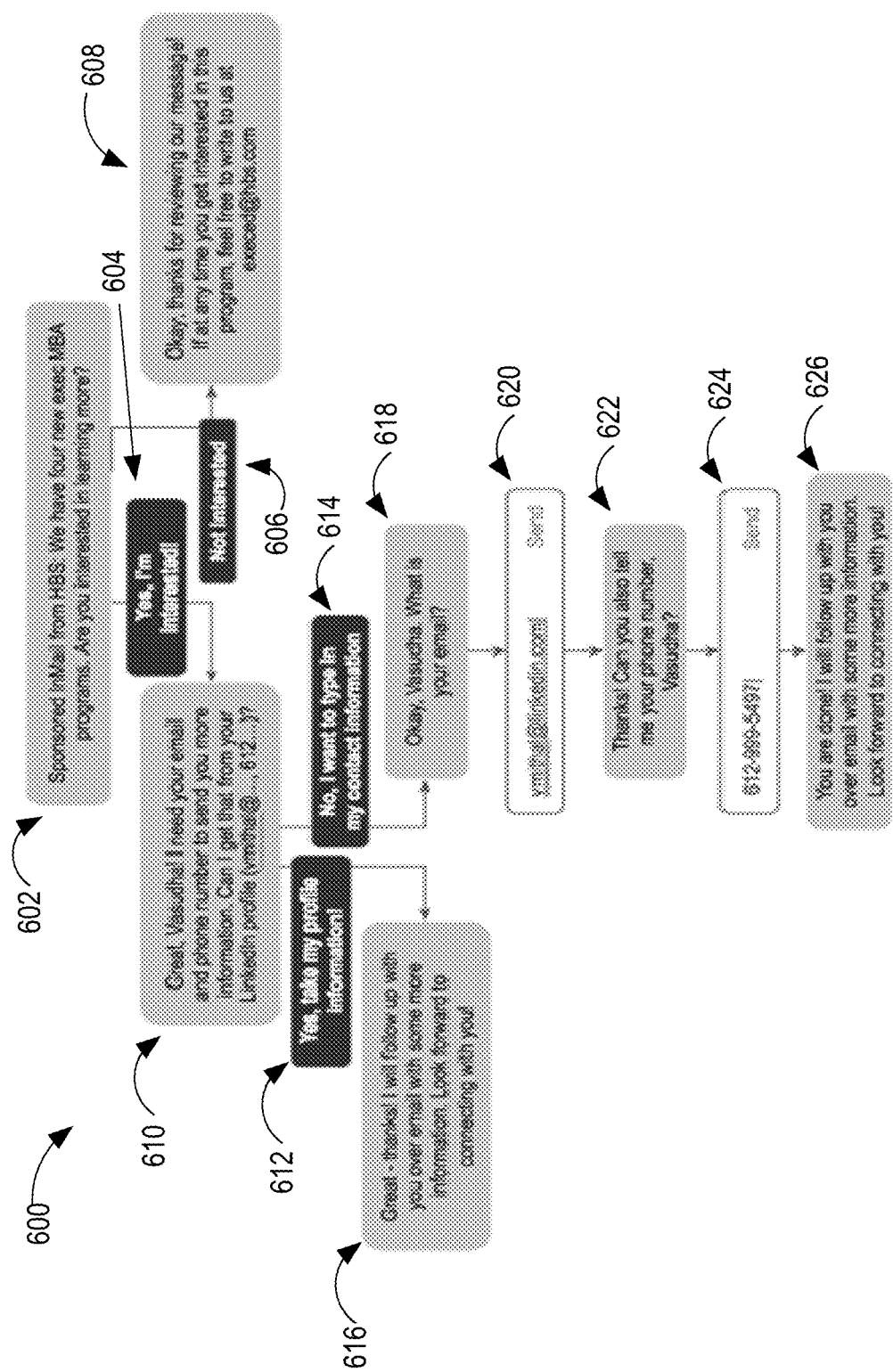
FIG. 6 is block diagram that depicts an example decision tree involving another example way to spur lead generation, in an embodiment.

FIG. 6 is block diagram that depicts an example decision tree 600 involving another example way to spur lead generation, in an embodiment. Decision tree 600 includes a message 602 that is displayed to multiple targeted users and asks whether the targeted user is interested in a graduate level program. Message 602 is associated with yes/no options 604 and 606. If a targeted user selects "no" option 606, then a message 608 that is linked to option 606 (in decision tree 600) is retrieved from decision tree 600 and presented in a messaging interface of the targeted user. If a targeted user selects "yes" option 604, then a message 610 that is linked to option 604 (in decision tree 600) is retrieved from decision tree 600 and presented in a messaging interface of the targeted user.

In this example, message 610 includes a name reference point that is filled in when message 610 is presented. In this way, message 610 is personalized for the targeted user. Messaging system 200 (or, for example, content delivery system 120) may fill in the name of the targeted user by accessing a (e.g., public) profile of the targeted user. The profile may be maintained by a social network service associated with messaging system 200.

In creating a decision tree such as decision tree 600, a content provider may be limited in the type of information that may be extracted from a targeted user's profile in order to personalize messages for the targeted user. For example, only a first and last name may be used. As another example, any targeting criteria that was used to identify the user as a targeted user may be used.

When message 610 is presented in a messaging interface of a targeted user, yes/no options 612 and 614 are also presented to the targeted user. If a targeted user selects "yes" option 612, then a message 616 that is linked to option 612 (in decision tree 600) is retrieved from decision tree 600 and presented in a messaging interface of the targeted user. If a targeted user selects "no" option 614, then a message 618 that is linked to option 614 (in decision tree 600) is retrieved from decision tree 600 and presented in a messaging interface of the targeted user.

Option 612 and message 616 imply that the requested contact information is retrieved from a profile of the targeted user.

In decision tree 600, message 618 is not associated with a decision point or any options. Instead, message 618 is associated with waiting for text input from a targeted user. If a targeted user has not provided text input within a certain period of time after message 618 is presented (e.g., three days), then decision tree 600 may indicate that a reminder message (not depicted in decision tree 600) be automatically presented to the targeted user to remind the targeted user to provide the requested input.

In this example, after a targeted user provides an email address 620 through a messaging interface, a message 622 is retrieved from decision tree 600 and presented in a messaging interface of the targeted user. After the targeted user provides a phone number 624 through the messaging interface, a message 626 is retrieved from decision tree 600 and presented in the messaging interface of the targeted user.

Sender Permission

In an embodiment, a representative of a content provider acts on behalf of another person so that it appears as though the other user is interacting with a targeted user or is responsible for the messages that are presented to the targeted user. For example, a representative of a content provider submits a request to messaging system 200 or content delivery system 120 indicating that s/he is seeking to act on behalf of another user ("approver"). The system sends a message to the approver informing the approver about the request. If the approver provides input signaling that the representative is authorized to act on behalf of the approver, then an account associated with the representative is updated to indicate that the representative is authorized and the approver's name and/or image may be used in communications between the representative and one or more targeted users.

Such a request/permission scenario may occur during campaign creation so that each message that is sent to a targeted user is associated with a name and an image of the approver or an icon representing the approver.

"Ask Your Network" Cards

Peer recommendation is an important step in a potential customer's journey. Many B2B buyers rely on peer recommendations when making a final purchasing decision. Many B2B buyers list peers and colleagues s their top source of information.

In an embodiment, a conversation history of a targeted user includes a prompt to share information about a product, service, or an event with one or more friends or connections in the targeted user's social network. The conversation history includes a search field for the targeted user to enter a search query to identify such friends/connections (hereinafter "connections"). For example, typing in the letter "T" causes a list of first or last names (with the same first letter) of multiple connections to be presented. From the list, the targeted user may enter more letters to narrow the list and/or may select one or more names in the list. After selecting one or more names, an in-network message is sent to a message account of each connection whose name was selected.

Figure 7A:
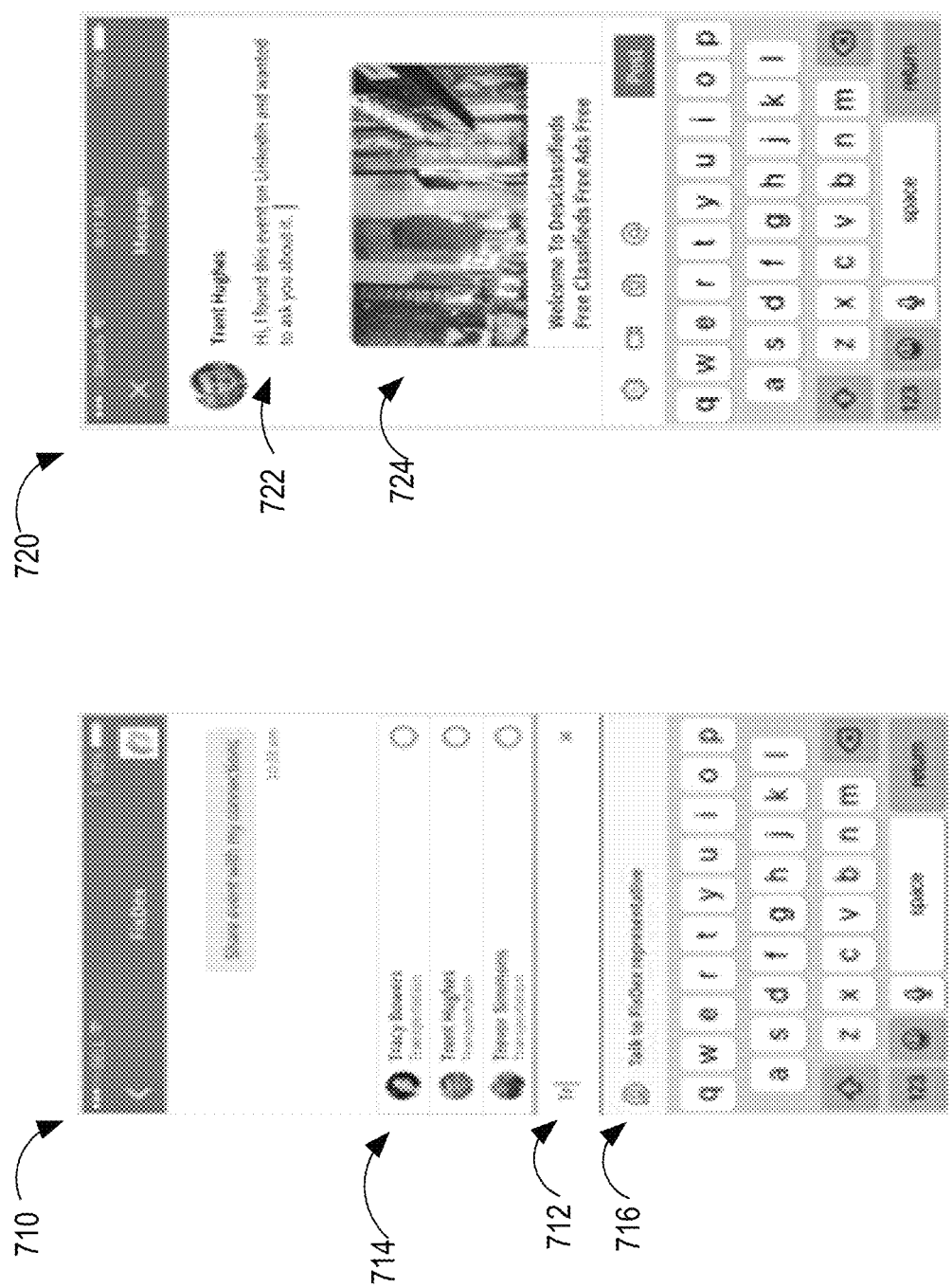
FIGS. 7A-7B are screenshots depicting example messaging interfaces for reaching out to connections of a targeted user, in an embodiment.

FIG. 7A includes screenshots 710 and 720 depicting example messaging interfaces, in an embodiment. Screenshot 710 includes a search field 712, a list of matching names 714, and a live representative icon 716 (described in more detail herein). In this example, the targeted user entered "Tr" in search field 712. In response, messaging system 200 identifies, in the targeted user's social network, connections, each of whose (first or last) name begins with "Tr." In this example, three connections are identified and listed in the list of matching names 714.

Screenshot 720 is of a conversation history with one of the three listed connections in list 714. Thus, the conversation history is personal to the targeted user and the selected connection. Screenshot 720 includes a message 722 and an image 724. The content of message 722 and image 724 may be pre-defined. Thus, message 722 and/or image 724 may be automatically populated in the conversation history. Alternatively, the content of message 722 may be customized or at least customizable.

Figure 7B:
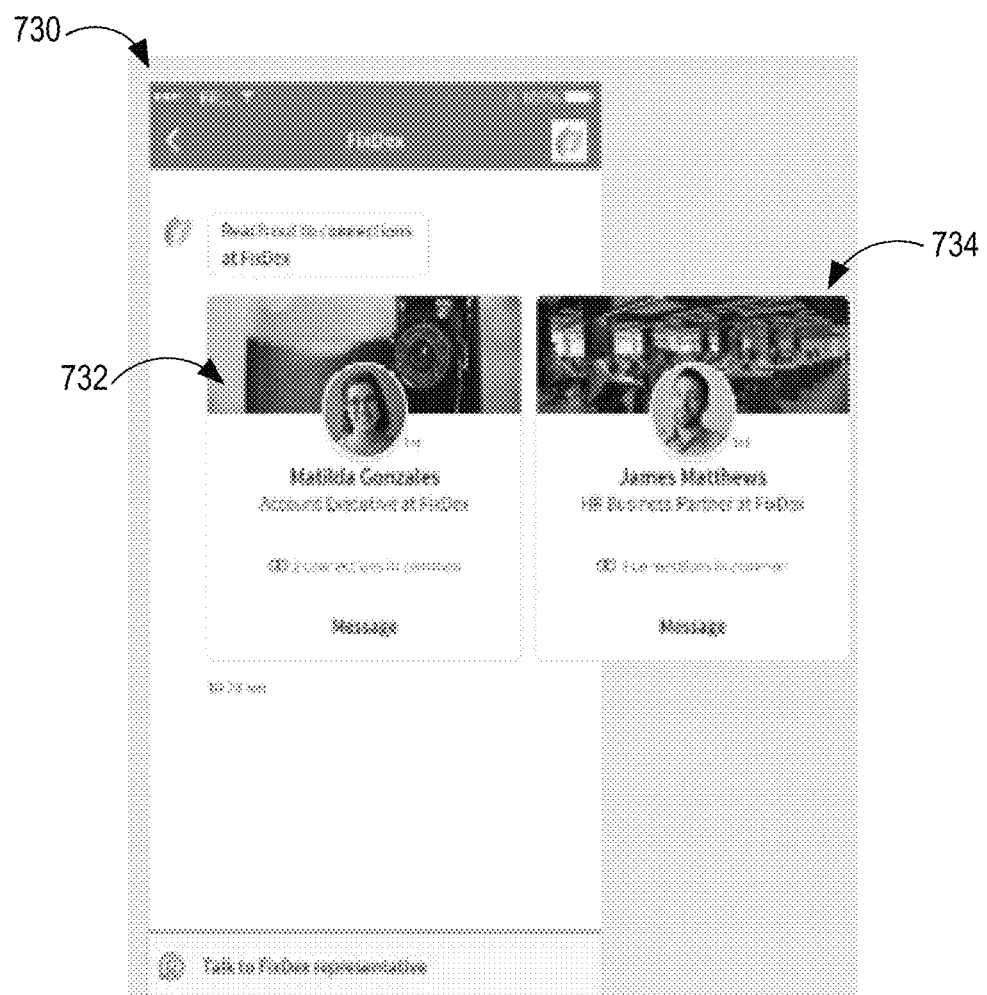

FIG. 7B includes screenshot 730 depicting an example "intelligent" messaging interface, in an embodiment. In this example, messaging system 200 (or system 120 or system 130) identifies connections in the social network of the targeted user without relying on input from the targeted user to identify those connections. One or more criteria may be used to automatically identify the connections, such as connections who are affiliated with the corresponding content provider (as indicated in their respective user profiles), such as a current or former employee, someone who previously applied to work for the content provider, a customer of the content provider, and someone who commented on the content provider and/or one of its products/services. Other example criteria that may be used to automatically identify connections include the same targeting criteria of the corresponding content delivery campaign, such as a job title, industry, company size, etc. Connections that match more targeting criteria may be ranked higher than connections that match less targeting criteria.

In the depicted example, at least two cards 732 and 734 are identified. Each card is associated with a connection and includes an image or picture of the connection, profile information of the connection, and a "Message" button that, when selected, causes a pre-defined message to be sent to a messaging account of the connection. Screenshot 720 depicts an example of such a message. Again, the message may be prepopulated (e.g., including a name of the connection), but customizable.

If there are multiple connections and their respective cards cannot fit on a screen of the computing device of the targeted user, then the cards may be scrollable. In this example, the cards are horizontally scrollable.

Transitioning to Live Chat

In an embodiment, a targeted user of a content delivery campaign that involves a decision tree of pre-defined messages and replies is transitioned to a live chat scenario where future messages in the current conversation are between the targeted user and a real person associated with the content provider.

In the example of FIG. 7A, live representative icon 716, when selected, causes messaging system 200 to notify a representative of the corresponding content provider. In an embodiment, if icon 716 is selected, the conversation history up to that point (including one or more messages and decision points from the corresponding decision tree and selected options) is transmitted to a computing device of the content provider along with a conversation or other identifier that uniquely identifies the session. Messaging system 200 effectively acts as a bridge between the targeted user and the content provider. A representative of the content provider can view the conversation history and transmit messages to the messaging interface through messaging system 200 using the conversation (or other) identifier. Similarly, any messages composed and submitted by the targeted user are forwarded to the computing device of the content provider.

In a related embodiment, the representative of the content provider operates a computing device that is logged into messaging system 200, in which case the content provider is registered with their own account. In this way, messages between the representative and the targeted user do not need to leave messaging system 200 or its local secure network.

Meeting Scheduler

In an embodiment, a decision tree includes a meeting message. The meeting message is presented in a conversation history of a messaging thread of a targeted user in response to the targeted user selecting an option of a decision point in the decision tree. The meeting message may include one or more default attribute values about a proposed meeting, such as a date, a time, one or more participants, a location, and a dial-in number. The meeting message may include graphical elements that allow the targeted user to adjust a default attribute value or to set one or more attribute values if there is no default value.

Once the attribute values of the proposed meeting are established and agreed upon by the targeted user, the targeted user may provide input to schedule the meeting. A personal calendar of the targeted user may be automatically updated based on the meeting in one or more ways. For example, in response to receiving input that indicates that the targeted user agrees to the meeting, messaging system 200 (or system 120 or system 130) transmits meeting data to the content provider, which transmits a meeting request to an email address of the targeted user using the attribute values established previously. (The targeted user may have previously agreed to allow the content provider to contact the targeted user with the email address or may have previously entered the email address into the conversation history.)

Figure 8:
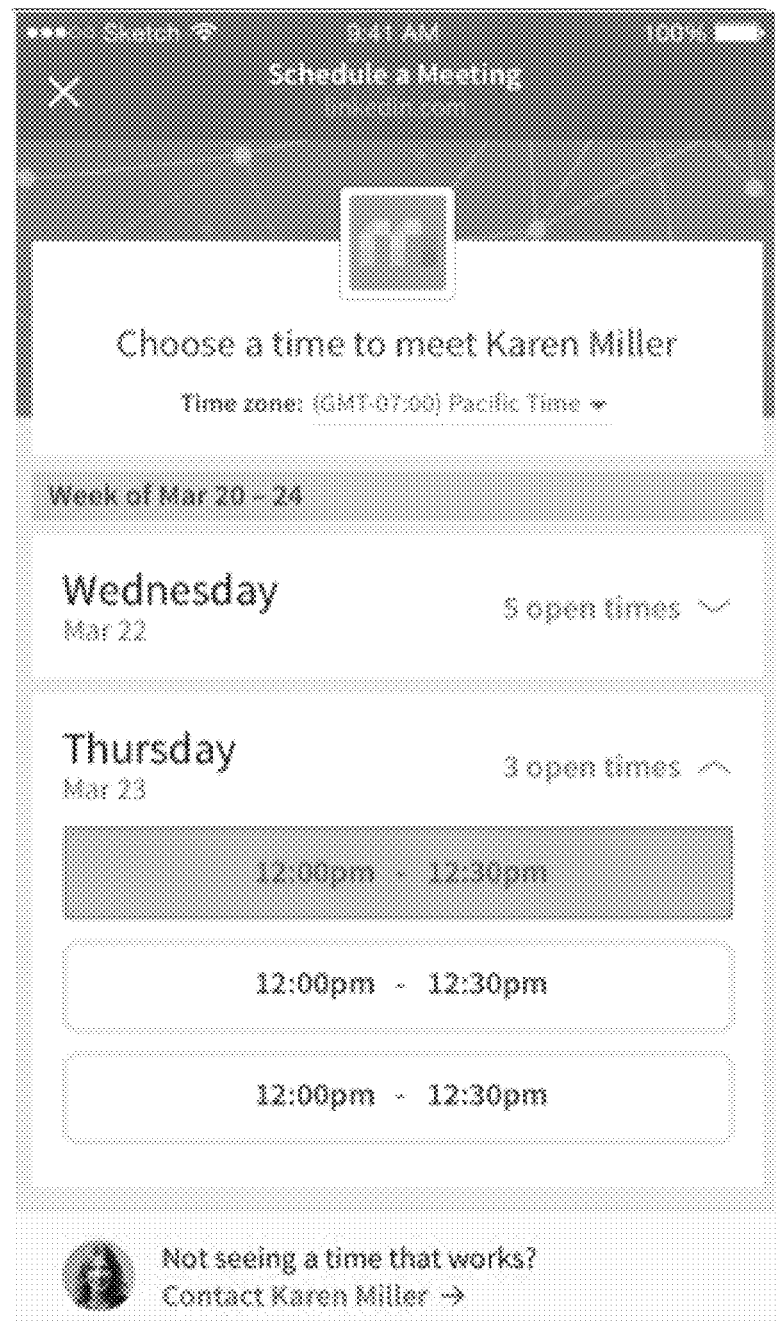
FIG. 8 is a screenshot of an example messaging interface for scheduling a meeting, in an embodiment.

In a related example, messaging system 200 is communicatively coupled to a work calendar of a representative of the content provider. The work calendar may be hosted by a third-party calendaring system or may be hosted by messaging system 200 or publisher system 130, in which case accessing the work calendar is less complicated and does not require off-network communications. Messaging system 200 determines a current availability of the representative and provides user interface elements to the targeted user to allow the targeted user to select one or more open slots on one or more days. FIG. 8 is a screenshot 800 of an example messaging interface, in an embodiment. The messaging interface presents two days and, for each day, indicates a number of slots that are available for a representative of the content provider. For one of the days, selectable slots 810 are presented to the targeted user.

Follow Up Rules

In an embodiment, a decision tree is associated with one or more follow up rules. A follow up rule dictates when a particular message from the decision tree should be sent to one or more targeted users. The purpose of the particular message may vary. For example, if a targeted user has not selected one of multiple options (from a decision point) that were presented N days ago, then a follow up message is presented in the conversation history while retaining the multiple selectable options (or presenting a different set of options), inviting the targeted user to select one of the options or ask whether the targeted user is still interested.

As another example, if a targeted user signed up for an event (such as a tradeshow, a marketing call, or a phone chat with a representative), then the particular message may be to remind the targeted user about the event in case the targeted user forgot.

As another example, if a targeted user attended an event or participated in a phone call, then a follow up message may ask the targeted user one or more questions about the event/call. The questions may be in the form of a decision point comprising multiple pre-defined options for selection, such as "No, not interested in any more" or "Yes, please sign me up!"

In an embodiment, there are two categories of follow up rules: time-based and user activity-based. A time-based follow up rule dictates that a follow up message will be sent to a targeted user after a certain lapse of time since a previous message. A user activity-based follow up rule dictates that a follow up message will be sent to a targeted user (a) if the targeted user has not replied or engaged in the conversation after a certain period of time or (b) a certain amount of time after a particular event, such as a live event or a conference call.

In an embodiment, follow up rules are defined by administrators of messaging system 200, which ensures that content providers do not send too many messages to targeted users. In an alternative embodiment, content providers are able to define follow up rules, but may be limited in terms of the number of times each follow up rule may be invoked and/or how quickly after an event a follow up rule may be invoked.

Advantages

Business-to-business (B2B) content providers use a number of media channels to reach their prospects. An example of a media channel is a product like Sponsored Content where an update is displayed to members of a social network in a content item feed. Another example of a media channel Sponsored InMail, a LinkedIn product that offers a unique way of reaching prospects in the medium of messaging. However, a Sponsored InMail message is a 'one-way' form of communication. This means that content providers (e.g., marketers) can send, to a user, a message that includes a call-to-action button. If a user click on the button, then the user is either taken to the content provider's website or a lead generation form is opened for the user to fill in. There is no conversation possible in this format.

The concept of 'full funnel marketing' implies that content providers typically take prospects through a journey: introduce their brand (reach), get prospects interested in their content (engage), motivate them to express interest in the content provider's objective (convert) and then eventually convert them to a paying customer (nurture and follow-ups).

Embodiments described herein introduce a conversational format for content providers to enable them to implement full-funnel marketing, all while maintaining full context of their outreach with a prospect in a single message thread. Content providers are allowed to define their 'stories' in the form of a 'guided reply conversation' or decision tree. This means that content providers can establish pre-defined messages and define a set of reply options. Targeted users can click on any of the reply options to continue the conversation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
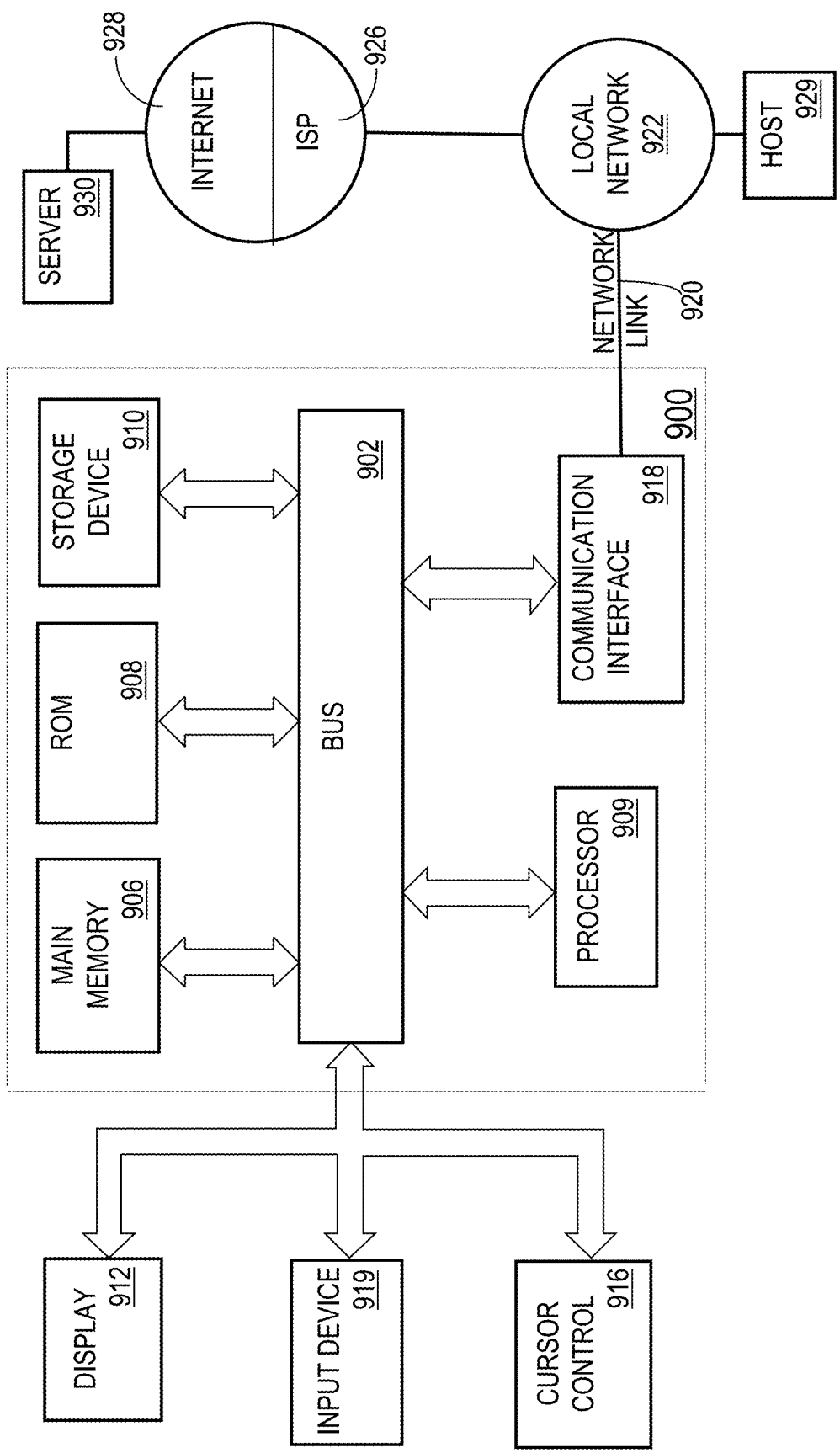
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for conducting a bi-directional digital conversation with an end-user, the method comprising:
    prior to activating a content delivery campaign, receiving, by a content delivery system, from a content provider that is different than the content delivery system, decision tree data and targeting criteria for the content delivery campaign;
    the decision tree data comprises nodes that represent pre-defined replies to end-user inputs and edges that represent decision points that include user-selectable options;
    storing, by the content delivery system, the decision tree data and the targeting criteria in storage;
    identifying, by the content delivery system, a plurality of entities that satisfy the targeting criteria;
    retrieving, by a messaging system that is associated with the content delivery system and that is different than the content delivery system, from the storage, first content from the decision tree data;

sending, by the messaging system, to a messaging account of each entity of the plurality of entities, the first content from the decision tree data;

causing, by the messaging system, the first content to be presented in a first message in a first messaging interface of a first entity of the plurality of entities;

in response to detecting that the first entity has provided particular input, the messaging system:
  identifying, based on the particular input and the decision tree data, second content from the decision tree data; and
  including, in the first messaging interface, first data associated with the particular input;

in response to identifying the second content and while the first content is included in the first messaging interface, causing, by the messaging system, the second content to be presented in a second message in the first messaging interface; and wherein the method is performed by one or more computing devices.

2. The method of claim 1, further comprising:
in response to detecting that a second entity of the plurality of entities has provided second input in a second messaging interface associated with the second entity:
  identifying, based on the second input and the decision tree data, third content that is from the decision tree data and that is different than the second content;
  including, in the second messaging interface, second data associated with the second input, wherein the second data is different than the first data; and
  in response to identifying the third content and while the first content is included in the second messaging interface, causing the third content to be presented in a third message in the second messaging interface.

3. The method of claim 1, wherein the decision tree data comprises a directed graph comprising the plurality of nodes, each of which contains content for a message to include in a messaging interface.

4. The method of claim 1, wherein:
the decision tree data comprises a decision point that comprises a plurality of options, each of which is associated with different content in the decision tree data; and
the first data is associated with one of the plurality of options but not others of the plurality of options.

5. The method of claim 1, further comprising:
receiving, via the first messaging interface, from the first entity, second input;
in response to receiving the second input, identifying a plurality of connections based on the second input and causing a list of indicators of the plurality of connections to be presented in the first messaging interface;
receiving, via the first messaging interface, third input that selects an indicator, in the list of indicators, that corresponds to a particular connection of the plurality of connections; and
in response to receiving the third input, causing a prepopulated message to be presented in a second messaging interface that is associated with the first entity and the particular connection.

6. The method of claim 1, further comprising:
identifying, based on one or more criteria, a plurality of connections of the first entity in an online social network of the first entity;
causing a list of indicators of the plurality of connections to be presented in the first messaging interface;

receiving, via the first messaging interface, second input that selects an indicator, in the list of indicators, that corresponds to a particular connection of the plurality of connections; and
in response to receiving second input, causing a prepopulated message to be presented in a second messaging interface that is associated with the first entity and the particular connection.

7. The method of claim 1, further comprising:
causing, to be presented in the first messaging interface, a third message that is associated with (1) a first option for the first entity to manually enter contact information and a (2) a second option for the messaging system to automatically retrieve, from a profile of the first entity, previously established profile information.

8. The method of claim 1, further comprising:
causing a particular graphical element to be presented in the first messaging interface;
in response to receiving second input that selects the graphical element, forwarding subsequent messages from the first entity to a particular messaging account associated with a representative of the content provider; and
causing subsequent messages that are from the representative and that are directed to the first entity to be presented in a messaging interface associated with the first entity.

9. The method of claim 1, further comprising:
receiving, through the first messaging interface, second input that indicates an intention by the first entity to schedule a meeting with a representative of the content provider;
identifying a plurality of options, each corresponding to a different date and time combination;
causing the plurality of options to be presented in the first messaging interface; and
receiving, via the first messaging interface, third input that selects a particular option of the plurality of options.

10. The method of claim 1, further comprising:
storing one or more follow up rules that indicate which content to present after a certain event, before the certain event, or after the lapse of a particular amount of time after a previous message to the first entity; and
based on one of the one or more follow up rules, identifying third content from the decision tree data and causing the third content to be presented in a third message in the first messaging interface.

11. One or more computer-readable media storing instructions which, when executed by one or more processors, cause:
receiving, by a content delivery system, from a content provider that is different than the content delivery system, decision tree data and targeting criteria for a content delivery campaign;
the decision tree data comprises a plurality of nodes that represent pre-defined replies to end-user inputs and a plurality of edges that represent decision points that include user-selectable options;
storing, by the content delivery system, the decision tree data and the targeting criteria in storage;
identifying, by the content delivery system, a plurality of entities that satisfy the targeting criteria;
retrieving, by a messaging system that is associated with the content delivery system and that is different than the content delivery system, from the storage, first content from the decision tree data;

sending, by the messaging system, to a messaging account of each entity of the plurality of entities, the first content from the decision tree data;

causing, by the messaging system, the first content to be presented in a first message in a first messaging interface of a first entity of the plurality of entities;

in response to detecting that the first entity has provided particular input, the messaging system:

identifying, based on the particular input and the decision tree data, second content from the decision tree data; and including, in the first messaging interface, first data associated with the particular input; and in response to identifying the second content and while the first content is included in the first messaging interface, causing the second content to be presented in a second message in the first messaging interface.

12. The one or more computer-readable media of claim 11, wherein the instructions, when executed by the one or more processors, further cause:

in response to detecting that a second entity of the plurality of entities has provided second input in a second messaging interface associated with the second entity:

identifying, based on the second input and the decision tree data, third content that is from the decision tree data and that is different than the second content; and including, in the second messaging interface, second data associated with the second input, wherein the second data is different than the first data; and in response to identifying the third content and while the first content is included in the second messaging interface, causing the third content to be presented in a third message in the second messaging interface.

13. The one or more computer-readable media of claim 11, wherein the decision tree data comprises a directed graph comprising the plurality of nodes, each of which contains content for a message to include in a messaging interface.

14. The one or more computer-readable media of claim 11, wherein:

the decision tree data comprises a decision point that comprises a plurality of options, each of which is associated with different content in the decision tree data; and the first data is associated with one of the plurality of options but not others of the plurality of options.

15. The one or more computer-readable media of claim 11, wherein the instructions, when executed by the one or more processors, further cause:

receiving, via the first messaging interface, from the first entity, second input;

in response to receiving the second input, identifying a plurality of connections based on the second input and causing a list of indicators of the plurality of connections to be presented in the first messaging interface;

receiving, via the first messaging interface, third input that selects an indicator, in the list of indicators, that corresponds to a particular connection of the plurality of connections; and in response to receiving the third input, causing a prepopulated message to be presented in a second messaging interface that is associated with the first entity and the particular connection.

16. The one or more computer-readable media of claim 11, wherein the instructions, when executed by the one or more processors, further cause:

identifying, based on one or more criteria, a plurality of connections of the first entity in an online social network of the first entity;

causing a list of indicators of the plurality of connections to be presented in the first messaging interface;

receiving, via the first messaging interface, second input that selects an indicator, in the list of indicators, that corresponds to a particular connection of the plurality of connections; and in response to receiving second input, causing a prepopulated message to be presented in a second messaging interface that is associated with the first entity and the particular connection.

17. The one or more computer-readable media of claim 11, wherein the instructions, when executed by the one or more processors, further cause:

causing, to be presented in the first messaging interface, a third message that is associated with (1) a first option for the first entity to manually enter contact information and a (2) a second option for the messaging system to automatically retrieve, from a profile of the first entity, previously established profile information.

18. The one or more computer-readable media of claim 11, wherein the instructions, when executed by the one or more processors, further cause:

causing a particular graphical element to be presented in the first messaging interface;

in response to receiving second input that selects the graphical element, forwarding subsequent messages from the first entity to a particular messaging account associated with a representative of the content provider; and causing subsequent messages that are from the representative and that are directed to the first entity to be presented in a messaging interface associated with the first entity.

19. The one or more computer-readable media of claim 11, wherein the instructions, when executed by the one or more processors, further cause:

receiving, through the first messaging interface, second input that indicates an intention by the first entity to schedule a meeting with a representative of the content provider;

identifying a plurality of options, each corresponding to a different date and time combination;

causing the plurality of options to be presented in the first messaging interface; and receiving, via the first messaging interface, third input that selects a particular option of the plurality of options.

20. The one or more computer-readable media of claim 11, wherein the instructions, when executed by the one or more processors, further cause:

storing one or more follow up rules that indicate which content to present after a certain event, before the certain event, or after the lapse of a particular amount of time after a previous message to the first entity; and based on one of the one or more follow up rules, identifying third content from the decision tree data and causing the third content to be presented in a third message in the first messaging interface.

* * * * *